(12) United States Patent
Ichikawa et al.

(10) Patent No.: US 9,243,586 B2
(45) Date of Patent: Jan. 26, 2016

(54) VENTILATION OUTLET STRUCTURE OF COGENERATION SYSTEM

(75) Inventors: Akiko Ichikawa, Saitama (JP); Atsumu Naoi, Saitama (JP); Kotaro Sugi, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 951 days.

(21) Appl. No.: 13/239,767

(22) Filed: Sep. 22, 2011

(65) Prior Publication Data
US 2012/0098260 A1   Apr. 26, 2012

(30) Foreign Application Priority Data

Oct. 20, 2010   (JP) ................................. 2010-235576

(51) Int. Cl.
| | | |
|---|---|---|
| F01K 27/02 | (2006.01) | |
| F02G 5/04 | (2006.01) | |
| F02B 63/04 | (2006.01) | |

(52) U.S. Cl.
CPC ............. *F02G 5/04* (2013.01); *F02B 2063/045* (2013.01); *Y02E 20/14* (2013.01); *Y02T 10/166* (2013.01)

(58) Field of Classification Search
CPC ....... F02B 2063/045; F02G 5/04; F02G 1/00; F02G 5/02; Y02E 20/14; Y02T 10/166
USPC ........ 454/155, 184, 262, 275, 276, 277, 278, 454/279, 280, 281, 282, 283, 347, 358, 454/367; 290/2
See application file for complete search history.

(56) References Cited

U.S. PATENT DOCUMENTS

| | | | | |
|---|---|---|---|---|
| 5,731,687 A | * | 3/1998 | Hirano et al. | ...................... 322/1 |
| 5,899,174 A | * | 5/1999 | Anderson et al. | .................. 123/2 |
| 5,929,611 A | * | 7/1999 | Scott et al. | ........................ 322/46 |
| 6,290,142 B1 | * | 9/2001 | Togawa et al. | ................ 237/12.1 |
| 6,643,130 B1 | * | 11/2003 | DeMarchis et al. | ........... 361/695 |

(Continued)

FOREIGN PATENT DOCUMENTS

| | | |
|---|---|---|
| EP | 2 397 667 A2 | 12/2011 |
| JP | S55-104730 A | 7/1980 |

(Continued)

OTHER PUBLICATIONS

English Machine Translation of Japanese Patent Publication JP11-200951A.*

(Continued)

*Primary Examiner* — Gregory Huson
*Assistant Examiner* — Dana Tighe
(74) *Attorney, Agent, or Firm* — Carrier Blackman & Associates, P.C.; Joseph P. Carrier; Jeffrey T. Gedeon (57) ABSTRACT

A ventilation outlet of a generation unit case installed outdoors and housing a generation unit including a generator and an internal combustion engine to drive the generator. The outlet comprise a maintenance box whose inside surfaces are attached with sound insulators and bored with an inlet hole at its upper portion to be communicated with an inside of the generation unit case and bored with an outlet hole at its lower portion that connects the inlet hole to exterior through a passage formed among the sound insulators. A flow guide plate is installed near the outlet hole to guide rainwater entered from outside to flow upward and a shield is installed at the passage to prevent the rainwater from flowing further upward.

5 Claims, 8 Drawing Sheets

(56) References Cited

U.S. PATENT DOCUMENTS

| | | |
|---|---|---|
| 7,461,617 B2 | 12/2008 | Onodera et al. |
| 2008/0169152 A1* | 7/2008 | Furuya .................. 181/224 |
| 2011/0303482 A1 | 12/2011 | Niwa et al. |

FOREIGN PATENT DOCUMENTS

| | | |
|---|---|---|
| JP | 08-074595 A | 3/1996 |
| JP | 11-200951 A | 7/1999 |
| JP | 2001-301473 A | 10/2001 |
| JP | 2002-030940 A | 1/2002 |
| JP | 2003-214176 A | 7/2003 |
| JP | 2004-162721 A | 6/2004 |
| JP | 2004-211554 A | 7/2004 |
| JP | 2006-200453 A | 8/2006 |
| JP | 2007-056760 A | 3/2007 |
| JP | 2008-082204 A | 4/2008 |
| JP | 2009-047053 A | 3/2009 |

OTHER PUBLICATIONS

English Machine Translation of Japanese Patent Publication JP2002-030940A.*

* cited by examiner

VENTILATION OUTLET STRUCTURE OF COGENERATION SYSTEM

BACKGROUND OF INVENTION

1. Technical Field

This invention relates to a ventilation outlet structure of a cogeneration system, particularly to a structure of a ventilation outlet formed at a generation unit case of a cogeneration system that is housed in the generation unit case that can be installed outdoors.

2. Background Art

A ventilation outlet of a cogeneration system housed in a generation unit case that can be installed outdoors includes a duct that is provided at the inner side of the case and attached with a sound insulator to mitigate the noise generated in a generation unit and a duct cover that is provided at the outer side of the case to prevent rainwater entry from the exterior, as taught by, for example, Japanese Laid-Open Patent Application No. Hei 11(1999)-200951.

SUMMARY OF INVENTION

In the reference, since the ventilation outlet is composed of the duct in the inside and the duct cover in the outside, it leads to the complicated structure and the increase in the number of components, and also it requires a large space, disadvantageously.

An object of this invention is therefore to provide a ventilation outlet structure of a cogeneration system that can achieve the simple structure and decrease the number of components, and also does not require a large space.

In order to achieve the object, this invention provides a ventilation outlet of a generation unit case housing a cogeneration system having a generation unit including a generator connectable to an AC power feed line between a commercial power network and an electrical load, and an internal combustion engine adapted to drive the generator and connectable to a thermal load through a heat exchanger, the generation unit case being adapted to be installed outdoors, wherein the ventilation outlet comprises: a box-shaped member whose inside surfaces are attached with sound insulators and bored with an inlet hole at its upper portion, in a gravitational direction when attached to the generation unit case, to be communicated with an inside of the generation unit case and bored with an outlet hole at its lower portion in the gravitational direction that connects the inlet hole to exterior through a passage formed among the sound insulators; a flow guide plate installed near the outlet hole to guide rainwater entered from outside to flow upward; and a shield installed at the passage to prevent the rainwater from flowing further upward.

BRIEF DESCRIPTION OF DRAWINGS

The above and other objects and advantages of the invention will be more apparent from the following description and drawings in which.

DESCRIPTION OF EMBODIMENT

An embodiment of a ventilation outlet structure of a cogeneration system according to the invention will now be explained with reference to the attached drawings.

Figure 1:
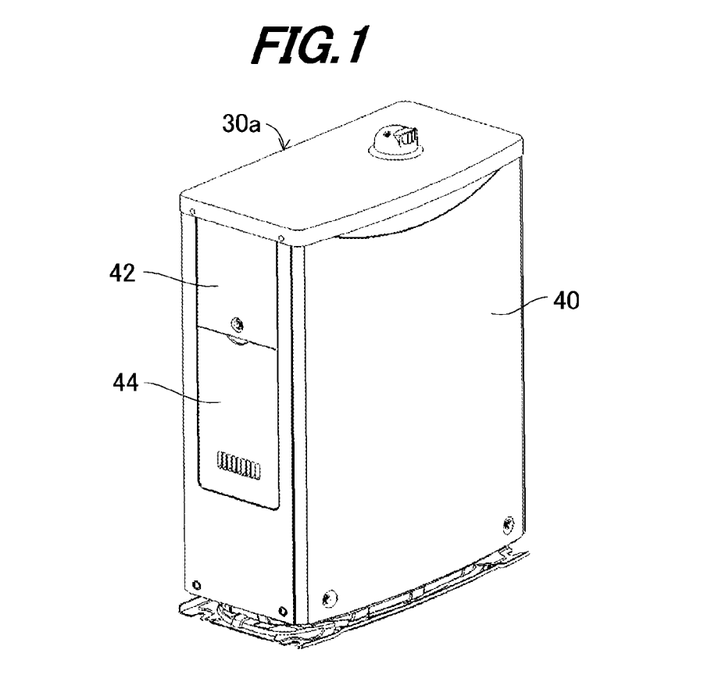
FIG. 1 is a perspective view of a generation unit case on the basis of which a ventilation outlet structure of a cogeneration system according to an embodiment of the invention is made.
Figure 2:
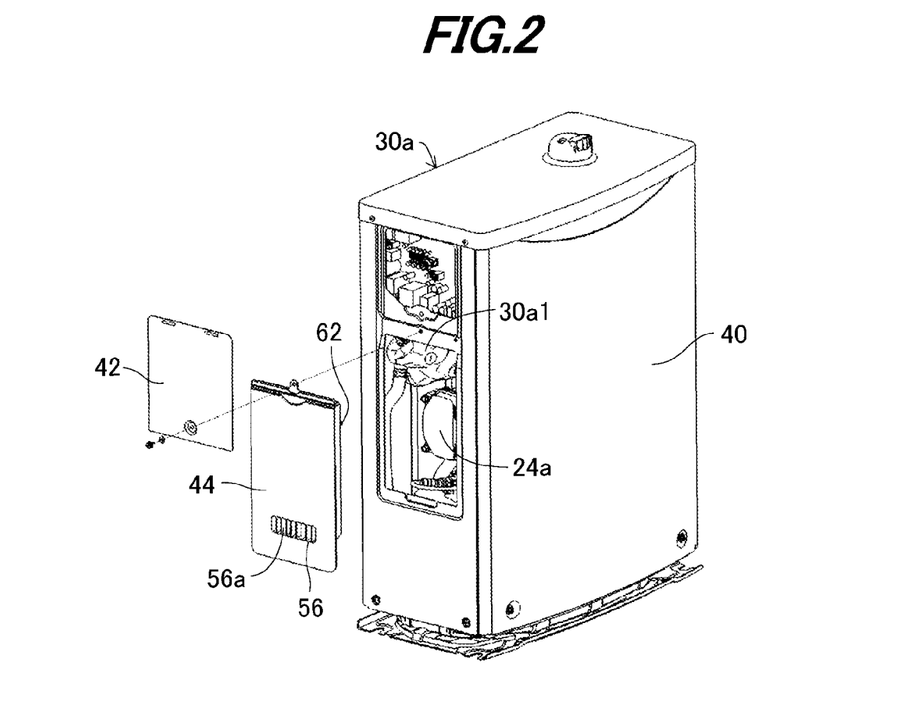
FIG. 2 is a perspective view of the generation unit case shown in FIG. 1 with a box-shaped member (covering member) removed.
Figure 3:
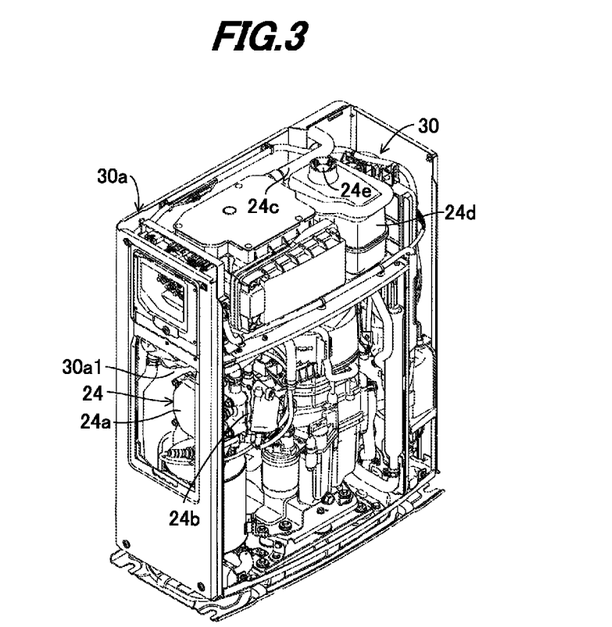
FIG. 3 is a perspective view of the generation unit case shown in FIG. 1 with a front panel and other components further removed.
Figure 4:
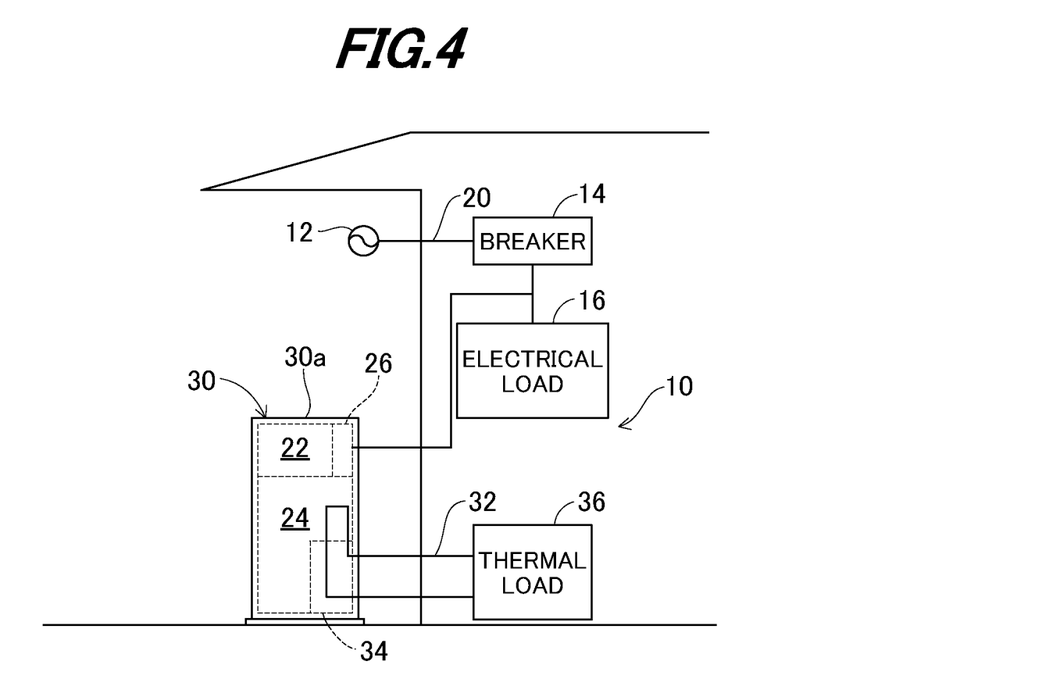
FIG. 4 is an overall view schematically showing the cogeneration system according to the embodiment of the invention.

FIG. 1 is a perspective view of a generation unit case on the basis of which a ventilation outlet structure of a cogeneration system according to an embodiment of the invention is made, FIG. 2 is a perspective view of the generation unit case shown in FIG. 1 with a box-shaped member (covering member) removed, FIG. 3 is a perspective view of the generation unit case shown in FIG. 1 with a front panel and other components further removed and FIG. 4 is an overall view schematically showing the cogeneration system according to the embodiment of the invention.

For ease of understanding, the explanation on FIG. 4 will be made first. A cogeneration system (designated by reference numeral 10) according to the embodiment is equipped with a generation unit 30 having a generator 22 constituted of multi-polar coils and connectable to an AC power feed line (power line) 20 between a commercial power source (commercial power network) 12 and electrical load (domestic electrical load) 16 through a breaker 14, an internal combustion engine (hereinafter called the "engine") 24 for driving the generator 22 and a power controller 26.

The power source 12 outputs or generates single-phase, three-wire, 100/200 V, 50 Hz (or 60 Hz) AC power.

The engine 24 is a single-cylinder, four-cycle, water-cooled, spark-ignition, OHV engine that runs on the city gas or LP (liquefied petroleum) gas and has a displacement of, for example, 163 cc. As shown in FIG. 3, a cylinder head 24a and cylinder block 24b of the engine 24 are laid in the lateral (horizontal) direction in a generation unit case 30a, and a piston (not shown) is accommodated therein to reciprocate.

Sucked air supplied from an air intake duct 24c is mixed with gas supplied from a gas supply source via a solenoid valve (not shown) by using a mixer. The air-fuel mixture thus produced flows into a combustion chamber (not shown) and burns upon ignition by a spark plug (not shown) to drive the piston, thereby rotating the crankshaft (not shown) connected to the piston in a longitudinal (vertical) direction in the case 30a. The generated exhaust gas passes through an exhaust pipe and exhaust duct and is discharged from an exhaust port 24e to the exterior of the case 30a, as deadening sound or noise through a muffler 24d.

The cogeneration system 10 is formed with a coolant circulation path 32 that is positioned near heating portions such as the cylinder block of the engine 24. The coolant comprising antifreeze liquid flows through the coolant circulation path 32 to heat-exchange with the heating portions, thereby cooling down the engine 24, while increasing its temperature. The coolant passes through a heat-exchanger 34 installed along the exhaust pipe to further increase the coolant temperature and is supplied to a thermal load 36 such as water heating equipment.

An upper end of the crankshaft of the engine 24 is installed with a flywheel and the interior thereof is installed with the generator 22 (not shown in FIG. 3). The generator 22 produces alternating current when rotating relative to the flywheel. The output of the generator 22 is sent to the power controller 26.

Although not illustrated, the power controller 26 includes an Electronic Control Unit (ECU) having a microcomputer, an inverter and a DC/DC converter. The inverter converts generated AC power to DC power, boosts its voltage through the DC/DC converter, and inverts the DC power to AC power through an accompanying converter circuit. Thus, the inverter transforms the output of the generator 22 to 100/200 V AC power (single phase).

An operation panel (not shown) is provided separately from the generation unit case 30a. The panel is installed with a warning lamp, etc., and also with a main switch (not shown) to be manipulated by the operator (user) to stop the operation of the cogeneration system 10 upon being made OFF. When a predetermined condition is established, the ECU of the power controller 26 makes the main switch 26 OFF to stop the operation of the cogeneration system 10.

The power output of the generation unit 30 is 1.0 kW or thereabout. The output of the inverter is connected to the power feed line 20. The generator 22 functions also as a starter motor for cranking the engine 24 when supplied with power from the power source 12 through the inverter. The ECU of the power controller 26 switches the function of the generator 22 between the starter and generator and controls the operation of the engine 24, etc.

The generation unit 30 comprising the generator 22, engine 24 and power controller 26 is formed integral therewith and housed in the generation unit case 30a to be installed outdoors or outside, as shown in FIG. 4.

As shown in FIGS. 1 and 2, the case 30a has a cuboid shape and is about 900 millimeters high, 600 millimeters wide and 400 millimeters long. A front surface of the case 30a has a detachable front panel 40 and a side surface thereof has a detachable side panel 42 and maintenance box (box-shaped member) 44 that closes the side surface.

As shown in FIGS. 2 and 3, the maintenance box 44 is detachably attached to the case 30a in the vicinity of the cylinder head 24a of the engine 24.

Figure 5:
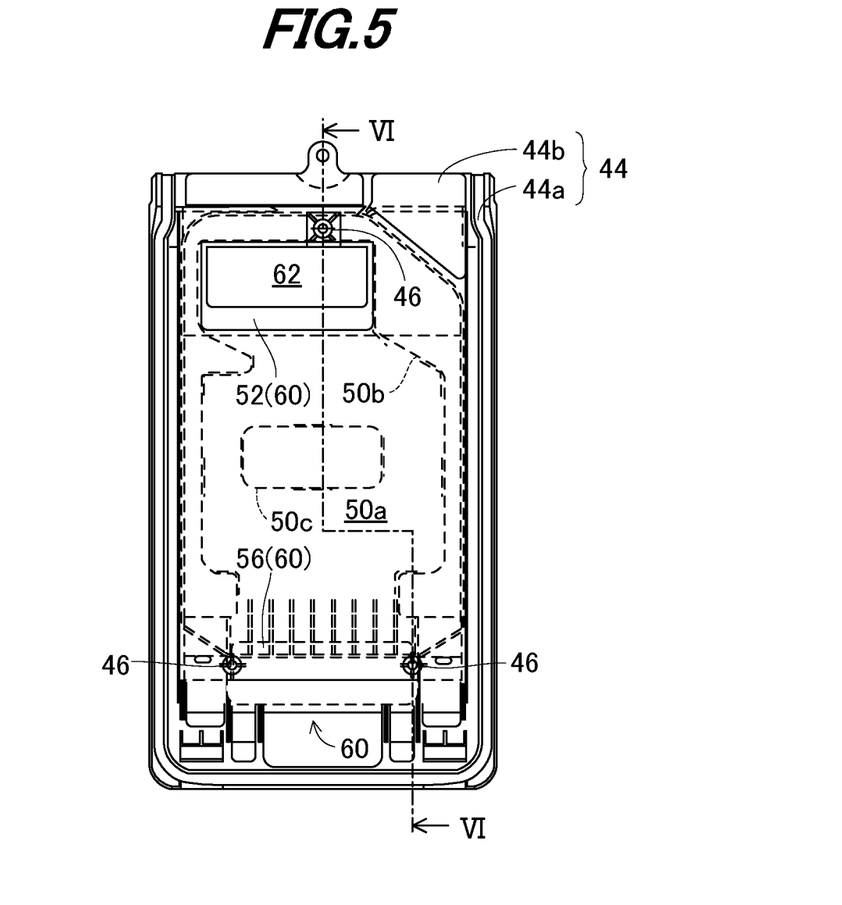
FIG. 5 is a back view of a maintenance box (box-shaped member) of the generation unit case shown in FIG. 1, etc.
Figure 6:
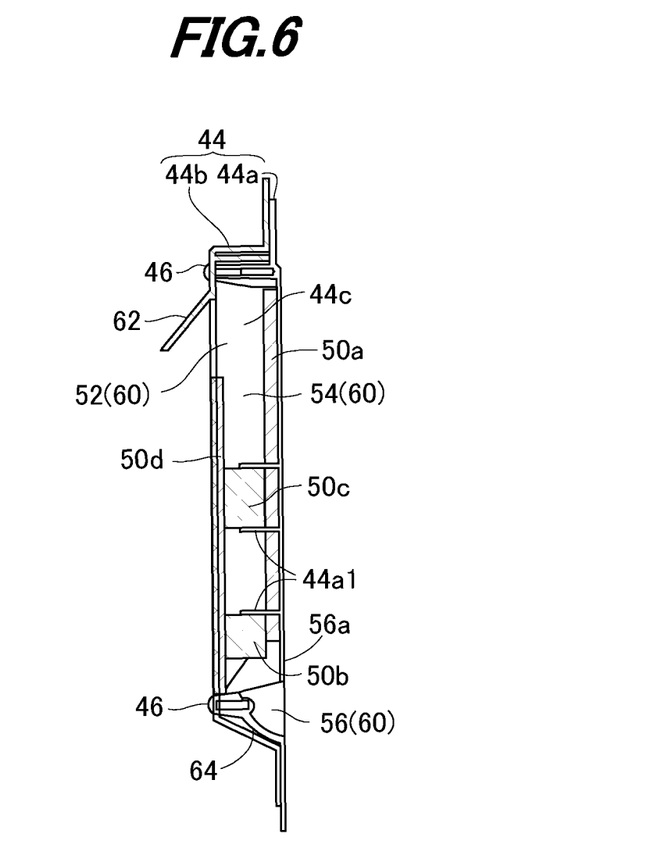
FIG. 6 is a cross-sectional view taken along a line of VI-VI of FIG. 5.
Figure 7:
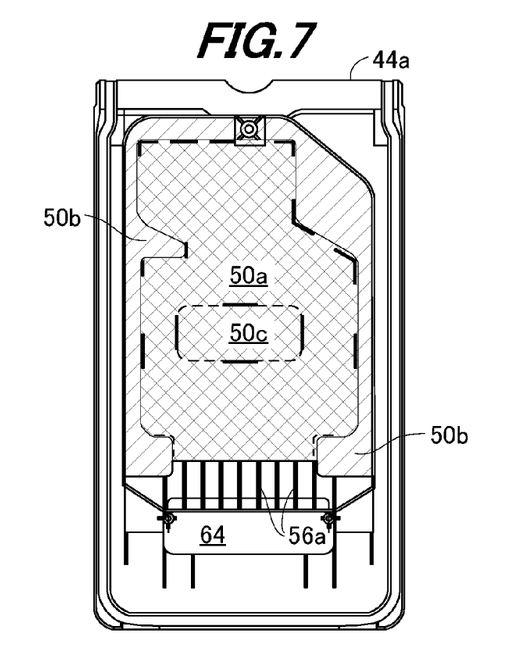
FIG. 7 is a plan view of a resin panel of the maintenance box shown in FIG. 1, etc.
Figure 8:
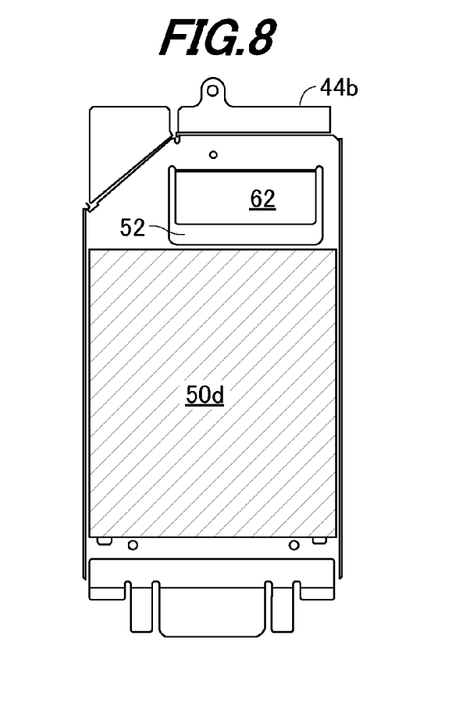
FIG. 8 is a plan view of a sheet-metal box of the maintenance box shown in FIG. 1, etc.
Figure 9:
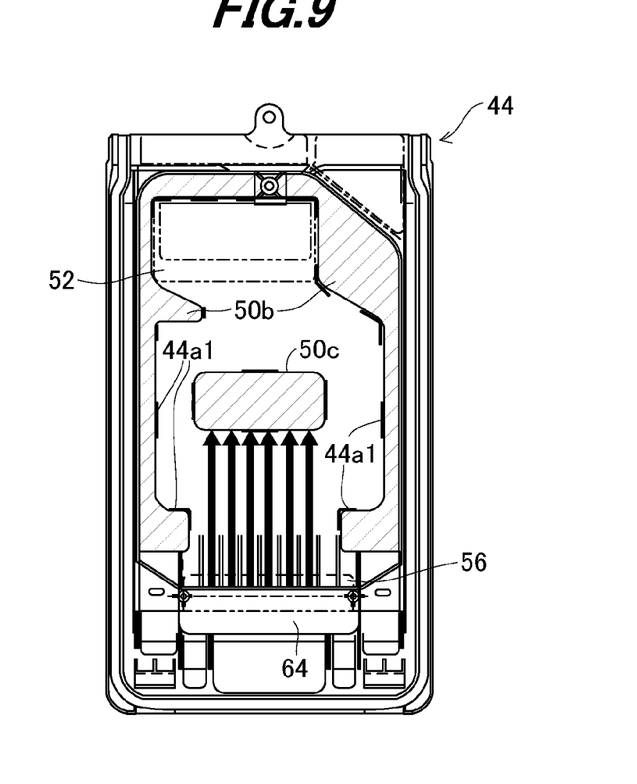
FIG. 9 is a plan view showing the interior of the maintenance box shown in FIG. 1, etc., with focus on its rainwater entry prevention structure.
Figure 10:
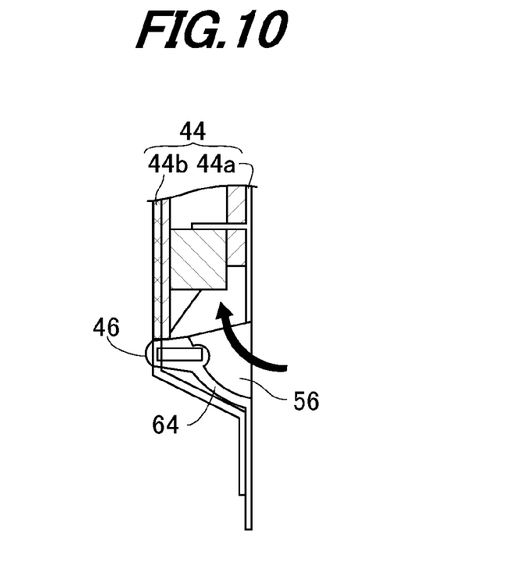
FIG. 10 is an explanatory sectional view of a flow guide plate that is a part of the rainwater entry prevention structure of the maintenance box shown in FIG. 9.
Figure 11:
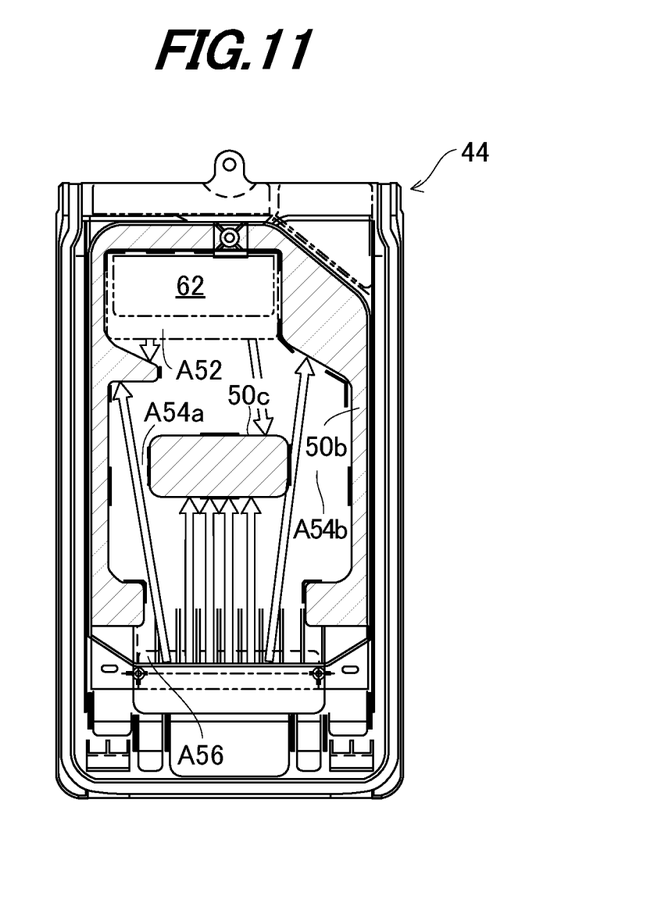
FIG. 11 is a plan view showing the interior of the maintenance box shown in FIG. 1, etc., with focus on its sound insulation structure.

FIG. 5 is a back view of the maintenance box 44, FIG. 6 is a cross-sectional view taken along a line of VI-VI of FIG. 5, FIG. 7 is a plan view of a resin panel of the maintenance box 44, FIG. 8 is a plan view of a sheet-metal box of the maintenance box 44, FIG. 9 is a plan view showing the interior of the maintenance box 44 with focus on its rainwater entry prevention structure, FIG. 10 is an explanatory sectional view of a flow guide plate that is a part of the rainwater entry prevention structure of the maintenance box 44 and FIG. 11 is a plan view showing the interior of a sound insulation structure of the maintenance box 44.

This embodiment is characterized in that a ventilation outlet of the case 30a is configured to have the maintenance box (box-shaped member) 44.

The explanation will be made on this feature. The maintenance box 44 has a thin box shape as shown in FIG. 2 and formed by fastening a sheet-metal box 44b of U-shape in cross-section to a resin panel 44a of a substantially flat shape with bolts 46 at three places.

As shown in FIGS. 6 to 8, surfaces of an interior space (inside) 44c of the maintenance box 44 formed by the resin panel 44a and sheet-metal box 44b is attached with sound insulators 50 composed of sponge or the like.

As clearly seen in FIGS. 5 to 8, the sound insulators 50 comprise a first sound insulating member (first member) 50a attached on the center surface of the resin panel 44a, a second sound insulating member (second member) 50b attached around the member 50a, a third sound insulating member (third member; shield) 50c locally attached at the center or thereabout of the member 50a, and a fourth sound insulating member (fourth member) 50d attached on the back surface of the sheet metal box 44d to cover most part thereof.

As shown in FIG. 6, each of the first and fourth members 50a, 50d is about one fourth the thickness of the height of the interior space 44c, while each of the second and third members 50b, 50c has about the thickness to reach the fourth member 50d. The interior space 44c of the maintenance box 44 is attached with the first to fourth members 50a, 50b, 50c, 50d with no space therebetween.

An upper portion of the second member 50b above the third member 50c (in the gravitational direction when the maintenance box 44 is attached to the case 30a) is formed to be laterally asymmetric when viewed from the top. The second and third members 50b, 50c are supported by stays 44a1 standing on the resin panel 44a.

The maintenance box 44 is bored at its upper portion (in the gravitational direction when attached to the case 30a) with an inlet hole 52 that is communicated with an inside 30a1 of the case 30a (shown in FIGS. 2 and 3) and at its lower portion (in the gravitational direction) with an outlet hole 56 that connects the inlet hole 52 to the exterior through a passage 54 formed among the sound insulators 50 (first to fourth members 50a, 50b, 50c, 50d).

Thus, the maintenance box 44 is formed with the ventilation outlet (now assigned reference numeral 60) comprising the inlet hole 52, passage 54 and outlet hole 56. The outlet hole 56 of the ventilation outlet 60 is provided with a grille 56a (although it is installed over the entire length of the outlet hole 56 as shown in FIGS. 1 and 2, partially shown in FIG. 6, etc., for ease of illustration).

When defining the cross-sectional areas (opening areas) of the passage 54 at the both (opposite) sides of the third member 50c as A54a, A54b and the opening areas of the inlet hole 52 and outlet hole 56 as A52, A56 as shown in FIG. 11, the ventilation outlet 60 is formed to satisfy the following formula.

$$A54a + A54b \geq A52 \geq A56$$

Specifically, the case 30a is bored with a ventilation inlet on the back side in FIG. 1 and air entered from the ventilation inlet flows through the inside 30a1 of the case 30a, flows into the maintenance box 44 from the inlet hole 52, flows through the passage 54, and then is discharged to the exterior from the outlet hole 56. In other words, air entered from the ventilation inlet is discharged through the ventilation outlet 60 (comprising the inlet hole 52, passage 54 and outlet hole 56). In the ventilation outlet 60, although the third member 50c is installed in the passage 54, the cross-sectional areas A54a, A54b beside the opposite sides of the third member 50c are configured not to interfere with the air flow, thereby ensuring the necessary area for ventilation.

A reflector 62 that decreases invasion sound or noise generated by the engine 24 is provided near the inlet hole 52. As shown in FIGS. 2 and 6, the reflector 62 is formed to protrude from an upper edge of the inlet hole 52 to extend obliquely downward, i.e., toward the cylinder head 24a of the engine 24.

Owing to this configuration, when noise generated by the engine 24 invades or enters through the inlet hole 52, part of the noise strikes against the reflector 62 and the noise is attenuated accordingly, thereby decreasing the noise of the engine 24.

The maintenance box 44 is also provided near the outlet hole 56 with a flow guide plate 64 for guiding incoming rainwater to flow upward, and at the passage 54 with the shield (i.e., the third member 50c) for preventing further entry of incoming rainwater.

As shown in FIG. 6, the flow guide plate 64 extends obliquely upward from the outlet hole 56 bored in the resin panel 44a toward the sheet-metal box 44b facing thereto, so that it guides rainwater entered from the outside to flow toward the upper side.

Next, rainwater entry prevention structure of the maintenance box 44 will be explained with reference to FIGS. 9 and 10.

As mentioned above, since the maintenance box 44 is provided near the outlet hole 56 with the flow guide plate 64 guiding incoming rainwater to flow upward as shown in FIG. 10, the incoming rainwater goes upward as shown in FIG. 9. However, since the third member 50c is installed at the passage 54, it prevents the rainwater from going further inside and hence, it becomes possible to prevent entry of the rainwater into the inside 30a1 of the case 30a through the inlet hole 52.

In other words, since it is configured to guide rainwater to flow upward, while not providing an opening directly communicated with the inside 30a1 of the case 30a in the direction of the rainwater flow, it becomes possible to prevent entry of the rainwater into the inside 30a1 of the case 30a through the inlet hole 52.

Next, sound insulation structure of the maintenance box 44 will be explained with reference to FIG. 11.

As mentioned above, the surfaces of the interior space 44c of the maintenance box 44 is attached with the first to fourth members 50a, 50b, 50c, 50d, which are composed of sponge or the like, with no space therebetween and as shown in FIG. 11, the outlet hole 56 is not directly or linearly communicated with the inlet hole 52 (and the inside 30a1 of the case 30a) from any angle.

The same can be said for the inlet hole 52, i.e., the inlet hole 52 is not directly or linearly communicated with the outlet hole 56 from any angle.

Owing to this configuration, noise generated by the engine 24 and entered through the inlet hole 52 is absorbed and echo thereof is suppressed by the sound insulators 50, and in addition, the configuration deflects the noise, thereby effectively decreasing the noise of the engine 24. Further, since a part of incoming sound can be attenuated by the reflector 62 installed near the inlet hole 52, the noise of the engine can be further decreased.

Furthermore, when defining the cross-sectional areas (opening areas) of the passage 54 at the both (opposite) sides of the third member 50c as A54a, A54b and the opening areas of the inlet hole 52 and outlet hole 56 as A52, A56, the ventilation outlet 60 is formed to satisfy the formula of A54a+A54b≥A52≥A56. Therefore, although the third member 50c is installed in the passage 54, the cross-sectional areas A54a, A54b do not interfere with the air flow.

As stated above, the embodiment is configured to have a ventilation outlet (60) of a generation unit case (30a) housing a cogeneration system (10) having a generation unit (30) including a generator (22) connectable to an AC power feed line (20) between a commercial power network (12) and an electrical load (16), and an internal combustion engine (24) adapted to drive the generator and connectable to a thermal load through a heat exchanger (34), the generation unit case being adapted to be installed outdoors, wherein the ventilation outlet (60) comprises: a box-shaped member (maintenance box 44) whose inside surfaces are attached with sound insulators (50; a first sound insulating member (first member) 50a, a second sound insulating member (second member) 50b, a third sound insulating member (third member; shield) 50c, and a fourth sound insulating member (fourth member) 50d) and bored with an inlet hole (52) at its upper portion, in a gravitational direction when attached to the generation unit case (30a), to be communicated with an inside of the generation unit case (30a) and bored with an outlet hole (56) at its lower portion in the gravitational direction that connects the inlet hole (52) to exterior through a passage (54) formed among the sound insulators (50); a flow guide plate (64) installed near the outlet hole (56) to guide rainwater entered from outside to flow upward; and a shield (50c) installed at the passage (54) to prevent the rainwater from flowing further upward.

Specifically, in place of the conventional technique to apply the combination of a duct and duct cover, it is configured to use a single maintenance box (box-shaped member) 44. With this, compared to the conventional technique, the structure can be simpler, the number of components can be decreased, and also a large space is not required, thereby lowering the manufacturing cost.

Further, since the maintenance box 44 is bored with the inlet hole 52 at its upper portion, in the gravitational direction when attached to the generation unit case 30a, to be communicated with an inside of the generation unit case 30a and bored with the outlet hole 56 at its lower portion in the gravitational direction that connects the inlet hole 52 to exterior through the passage 54 formed among the sound insulators 50. With this, it becomes possible to circulate air entered from the ventilation inlet to flow through the inside 30a1 of the case 30a and discharge it to the exterior through the inlet hole 52, passage 54 and then the outlet hole 56, thereby reliably ventilating the inside 30a1 of the case 30a.

Further, since the passage 54 is formed among the sound insulators 50, the sound insulators 50 can absorb noise generated by the engine 24 of the generation unit 30 and also suppress echo of the noise, thereby effectively attenuating the noise of the engine 24 of the generation unit 30.

Further, the flow guide plate 64 is installed near the outlet hole 56 to guide rainwater entered from outside to flow upward and the shield 50c is installed at the passage 54 to prevent the rainwater from flowing further upward. With this, it becomes possible to effectively prevent entry of the rainwater into the generation unit 30.

Further, when noise generated by the engine 24 of the generation unit 30 passes through the inlet hole 52, passage 54 and outlet hole 56, the shield (third member 50c) installed at the passage 54 functions to interfere with the straight movement of the noise between the inlet hole 52 and outlet hole 56. Therefore, it becomes possible to attenuate the sound, thereby decreasing the noise.

In the outlet, the shield (50c) comprises a sound insulating member. With this, in addition to the above effects, it becomes possible to further decrease the noise of the engine 24 of the generation unit 30.

It should be noted in the above that, it is not indispensable for this invention that the shield comprises the sound insulator (third member 50c). It suffices if the shield can prevent entry of incoming rainwater, the shield may be composed of another material although the noise mitigating effect slightly deteriorates.

In the outlet, the box-shaped member (44) is adapted to be detachably attached to the generation unit case (30a) in vicinity of a cylinder head (24a) of the engine (24). With this, in addition to the above effects, it becomes possible for the operator (service person) to get closer to the cylinder head 24a of the engine 24 to implement the maintenance of tappet clearance, etc., only by detaching the maintenance box 44, without detaching another panel of the case 30a, thereby making the maintenance work easy.

The outlet further includes: a reflector (62) installed near the inlet hole (52) to decrease noise generated by the engine (24). With this, in addition to the above effects, it becomes possible to attenuate noise generated by the engine 24 of the generation unit 30 and entered through the inlet hole 52, thereby further decreasing the noise.

As shown in FIG. 11, the outlet is adapted to satisfy following formula, when defining cross-sectional areas of the passage (54) at the both sides of the shield (50c) as A54a, A54b and opening areas of the inlet hole (52) and outlet hole (54) as A52, A56, $$A54a+A54b \geq A52 \geq A56.$$

With this, the cross-sectional areas A54a, A54b do not interfere with the air flow.

It should be noted that, in place of the sponge, the sound insulator may be composed of any material that can cut noise.

It should also be noted that, although the gas engine using gas fuel such as the city gas or LP gas is taken as an example of the power source of the generator 22, the engine can be one utilizing gasoline fuel or the like instead. Also, the output of the generator 22, displacement of the engine 24 and the like are shown by specific values, but they are only examples and should not be limited thereto.

Japanese Patent Application No. 2010-235576 filed on Oct. 20, 2010, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A ventilation outlet of a generation unit case housing a cogeneration system having a generation unit including a generator connectable to an AC power feed line between a commercial power network and an electrical load, and an internal combustion engine adapted to drive the generator and connectable to a thermal load through a heat exchanger, the generation unit case being adapted to be installed outdoors, the ventilation outlet comprises:

a box-shaped member whose inside surfaces are attached with sound insulators and bored with an inlet hole at its upper portion, in a gravitational direction when attached to the generation unit case, to be communicated with an inside of the generation unit case and bored with an outlet hole at its lower portion in the gravitational direction that connects the inlet hole to exterior through a passage formed among the sound insulators;

a flow guide plate installed near the outlet hole to guide rainwater entered from outside to flow upward; and a shield installed at the passage to prevent the rainwater from flowing further upward, wherein the shield comprises a sound insulating member placed so as to block any possible straight line connecting the inlet hole with the outlet hole in a plan view of the box-shaped member.

2. The outlet according to claim 1, wherein the box-shaped member is adapted to be detachably attached to the generation unit case in vicinity of a cylinder head of the engine.

3. The outlet according to claim 1, further including:
a reflector installed near the inlet hole to decrease noise generated by the engine.

4. The outlet according to claim 1, wherein the box-shaped member comprises a maintenance box.

5. The outlet according to claim 1, wherein the shield is adapted to satisfy following formula, when defining cross-sectional areas of the passage at the both sides of the shield as A54a, A54b and opening areas of the inlet hole and outlet hole as A52, A56, $$A54a+A54b \geq A52 \geq A56.$$

* * * * *